C. M. STRATTON.
SEWER PIPE.
APPLICATION FILED SEPT. 18, 1908.
909,344.  Patented Jan. 12, 1909.
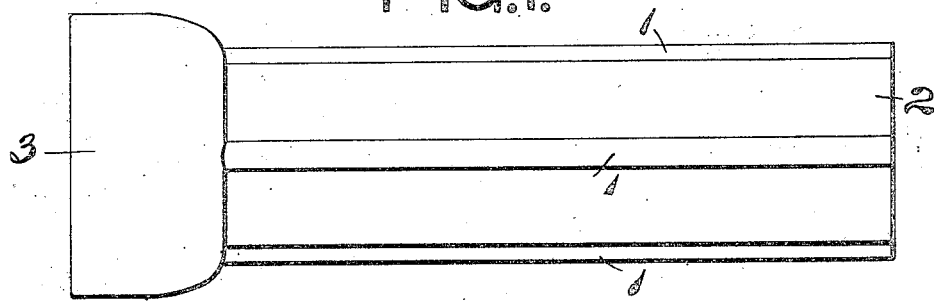
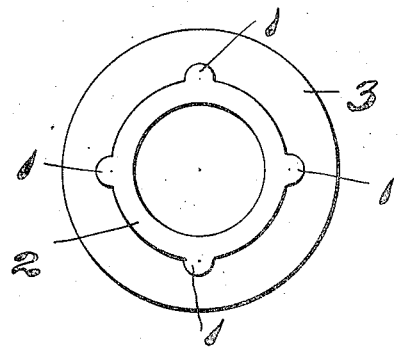
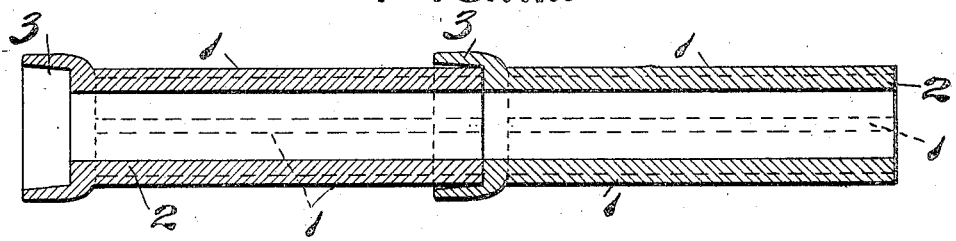
Inventor
Charles M. Stratton,
By Richard S. Morrison, his Attorney
Witnesses

UNITED STATES PATENT OFFICE.

CHARLES M. STRATTON, OF TORONTO, OHIO.

SEWER-PIPE.

No. 909,344.　　　Specification of Letters Patent.　　　Patented Jan. 12, 1909.

Application filed September 18, 1908. Serial No. 453,600.

*To all whom it may concern:*

Be it known that I, CHARLES M. STRATTON, a citizen of the United States, residing at Toronto, in the county of Jefferson and State of Ohio, have invented certain new and useful Improvements in Sewer-Pipes; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to improvements in pipe, such as is employed in the construction of sewers, drains, etc.

In the form of pipe at present employed for such purposes, it is difficult, if not almost impossible, to properly connect the pipe so that their openings will accurately register with one another and thus give an uninterrupted and uniform passage throughout the entire length of sewer, or drain, constructed therefrom.

My invention has for its objects, the provision of a pipe, for such purposes, which is not only capable of self-centering with one another, to avoid the above difficulty, but is reinforced throughout its entire length, thus causing it to be less liable to breakage than heretofore.

In the accompanying drawings, I have illustrated my invention by several views, wherein:

Figure I, is a plan view of my improved pipe. Fig. II, is an end view thereof, and Fig. III, is a longitudinal sectional view through two of the pipes as associated in practice, similar portions of the pipes being designated by like numerals of reference in the following description.

By further reference to said drawings, it will be observed that the invention resides in the forming of longitudinally-disposed plural ribs 1, upon the outer portion of the body 2, of the pipe, said ribs being of such thickness as to project beyond the outer surface of the pipe proper, as to cause self-centering when the small end of one is fitted into the socket or flanged head 3, of the other, as shown at Fig. III, thus causing the openings of each pipe to accurately register with the other throughout the length of the structure, at the same time leaving available space within the joint for the usual filling.

It will be readily apparent that the invention described not only has the advantage of reinforcement and ability of self-centering with another, but in consequence of its self-centering it occasions no care in associating them in the construction of a sewer, or drain, thus saving time.

Having thus shown and described my invention, what I claim as new and desire to secure by Letters Patent is:

1. As a new article of manufacture, a sewer pipe having a socket formed upon one end and provided with a plurality of longitudinally disposed ribs upon its exterior extending from the rear of the socket to the opposite extremity.

2. As a new article of manufacture, a sewer pipe having a socket formed upon one end and provided with a plurality of longitudinally and oppositely disposed ribs upon its exterior extending from the rear of the socket to the opposite extremity.

In testimony whereof, I affix my signature, in presence of two witnesses.

CHARLES M. STRATTON.

Witnesses:
　H. E. STRATTON,
　ARTHUR S. WEMPLE.